United States Patent [19]
Lorah et al.

[11] 4,019,811
[45] Apr. 26, 1977

[54] OPTICAL SCANNER

[75] Inventors: Lawrence D. Lorah, Concord; Richard W. Stresau, Somerville; Lawrence B. Lapson, Boston; Curtis P. van Vloten, Cambridge, all of Mass.

[73] Assignee: Rapifax Corporation, Fairfield, N.J.

[22] Filed: Mar. 26, 1975

[21] Appl. No.: 562,135

Related U.S. Application Data

[63] Continuation of Ser. No. 322,002, Jan. 8, 1973, abandoned.

[52] U.S. Cl. .................... 350/274; 350/6; 350/96 B; 350/275; 350/293; 358/200
[51] Int. Cl.² .................................. G02B 25/00
[58] Field of Search ......... 350/275, 273, 271, 96 B, 350/193, 6, 274; 178/7.6

[56] References Cited
UNITED STATES PATENTS

| | | | |
|---|---|---|---|
| 3,207,908 | 9/1965 | Murphy | 240/103 R |
| 3,345,460 | 7/1964 | Betts et al. | 178/7.6 |
| 3,562,426 | 2/1971 | Lavergne | 178/7.6 |
| 3,588,517 | 6/1971 | Maxwell, Jr. | 250/233 |
| 3,817,593 | 6/1974 | Harris et al. | 350/6 |

*Primary Examiner*—John K. Corbin
*Assistant Examiner*—B. W. delos Reyes
*Attorney, Agent, or Firm*—Shenier & O'Connor

[57] ABSTRACT

An optical scanner wherein the image of a straight line is focused by an optical element such as a concave mirror or converging lens on the arc of a circle which is scanned by a rotating drum having one or more field stops such as pin holes or optical fibers directing light upon a stationary photodetector. The optical center of the focussing element is disposed in the plane of the scanning circle; and the axis of rotation of the drum orthogonally intersects the plane at a point displaced from the optical center.

20 Claims, 6 Drawing Figures

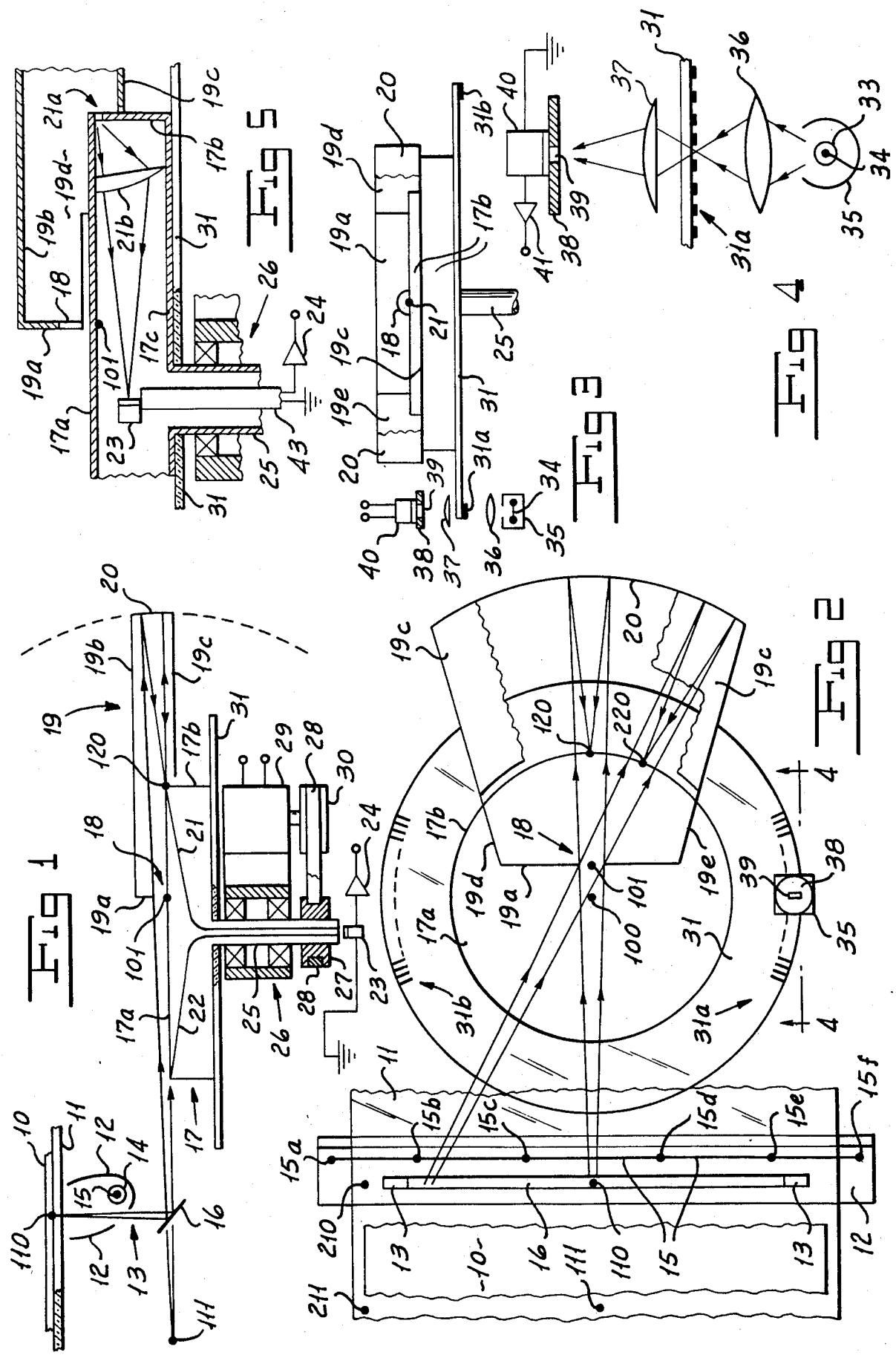

OPTICAL SCANNER

This is a continuation of application Ser. No. 322,002 filed Jan. 8, 1973, now abandoned.

BACKGROUND OF THE INVENTION

One of the most difficult problems in the design of any image transmission system is that of providing a suitable arrangement for scanning the original. The arrangement should provide moderately high resolution. It should operate a relatively high scanning rate. It must provide a straight line scan of a flat object field.

We have provided an optical scanner which successfully fulfills the requirements for an optical scanner. It provides relatively high resolution. It affords a straight line of a flat object field. It operates at a relatively high speed. It is relatively inexpensive to produce for the result achieved thereby.

SUMMARY OF THE INVENTION

One object of our invention is to provide an optical scanner wherein the image of a straight line is focused by an optical element such as a concave mirror or converging lens on the arc of a substantially coplanar circle.

Another object of our invention is to provide an optical line scanner wherein the image arc is scanned by a rotating drum having one or more field stops such as pin holes or optical fibers.

Still another object of our invention is to provide an optical line scanner having a semicircular aperture on the axis of the optical element.

Still another object of our invention is to provide an optical line scanner wherein the axis of the rotating drum orthogonally intersects the optical axis at a point displaced from the aperture stop.

Yet another object of our invention is to provide an optical scanner which provides a high speed straight line scan of a flat object field.

A further object of our invention is to provide an optical scanner which is relatively inexpensive to produce for the result achieved thereby.

Other and further objects of our invention will appear from the following description.

BRIEF DESCRIPTION OF THE DRAWINGS

In the accompanying drawings which form part of the instant specification and which are to be read in conjunction therewith and in which like reference numerals are used to indicate like parts of the various views:

FIG. 1 is a diagrammatic sectional side elevation showing a first embodiment of our invention.

FIG. 2 is a diagrammatic plan view with parts broken away showing the first embodiment of our invention.

FIG. 3 is a diagrammatic rear elevation with parts broken away showing the first embodiment of our invention.

FIG. 4 is a diagrammatic view taken along the line 4—4 of FIG. 2.

FIG. 5 is a fragmentary sectional side elevation showing a second embodiment of our invention.

DESCRIPTION OF THE PREFERRED EMBODIMENTS

Figure 6:
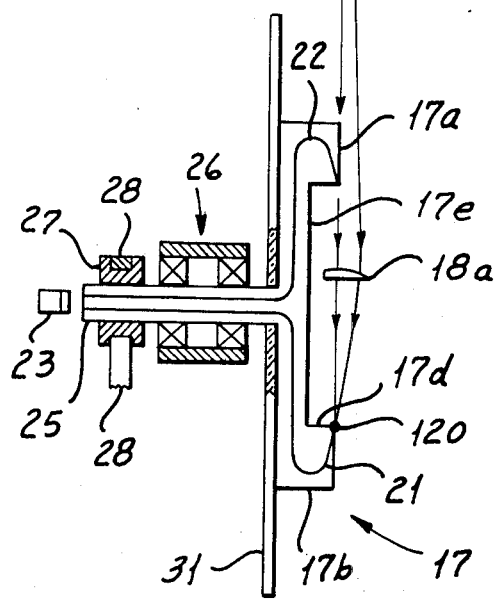
FIG. 6 is a diagrammatic sectional side elevation showing a third embodiment of our invention.

Referring more particularly now to FIGS. 1, 2 and 3 of the drawings, a sheet of paper 10 is placed face down upon a horizontally disposed transparent platen 11. Illumination is provided by a lamp 14 having a filament 15 which extends transversely of the paper 10. As may be seen from FIG. 1 filament 15 is positioned at one focus of a reflector 12 comprising an elliptic cylinder. The other focus of reflector 12 is at point 110 which lies on the line being scanned. The major axis of the elliptic cylinder is displaced at an appreciable angle of approximately 30° from the vertical. All the light from filament 15 which is collected by reflector 12 is brought to a focus along a line on the original document 10. The elliptical reflector 12 is provided with a slot 13 which is in substantially vertical alignment with the line on the original document. Positioned below slot 13 and in substantial vertical alignment with focus 110 is a planar mirror 16 disposed at an angle of 45° from the horizontal.

The scanning drum indicated generally by the reference numeral 17 is provided with a top wall 17a, a side wall 17b, and a bottom wall 17c (FIG. 5). Secured to the bottom wall 17c is a hollow vertically extending shaft 25. Shaft 25 is mounted for rotation about the axis 100 by a pair of vertically spaced ball bearings as indicated generally by the reference numeral 26. Secured to the lower end of shaft 25 is a pulley 27 driven by a belt 28. Belt 28 is driven by a pulley 30 secured to the shaft of an electric motor 29. Secured to the bottom wall 17c of the scanning drum is a transparent glass or plastic code disc 31.

A spherical mirror 20 having a center of curvature at 101 forms the rear wall of a substantially light tight enclosure 19. The front wall 19a of the enclosure is provided with a substantially semicircular aperture 18 at the center of curvature 101 of the spherical mirror 20. Enclosure 19 is provided with a top wall 19b, a bottom wall 19c and side walls 19d and 19e. As may be seen by reference to FIG. 5, the lower edges of walls 19a, 19d, and 19e should clear the upper surface 17a of the drum by a small gap of perhaps 10 to 30 mils. Also walls 19c, 19d, and 19e should clear the side wall 17b of the drum by a gap of perhaps from 10 to 60 mils. The optical axis of the spherical mirror 20 is horizontal and passes through the upper surface of the top wall 17a of the drum.

A radially disposed optical fiber 21 of approximately 1 mil diameter and extending upwardly at a slight angle from the horizontal, simultaneously pierces the top wall 17a and the side wall 17b of the drum. Thus the upper end of the optical fiber 21 rotates in a plane which includes the optical axis of mirror 20. A similar radially extending fiber 22 simultaneously pierces walls 17a and 17b at a point substantially 180° displaced from that of fiber 21. Fibers 21 and 22 extend to the center of drum 17 and then bend to extend along the axis of the hollow shaft 25. At the lower opening of the hollow shaft 25 is positioned a stationary photodetector 23 the output of which is applied to an amplifier 24. It will be understood that if desired, as many as eight optical fibers may be provided at intervals of 45°.

Referring now to FIGS. 2, 3, and 4, the circumference of the transparent code disc 31 includes a clock track comprising groups 31a and 31b of segments, each group subtending 44.4°. The radial extent of the clock track may range from less than 10 mils to more than 125 mils. The clock track may be photographically produced on the bottom surface of code disc 31 and may comprise radially extending opaque portions of approximately 1.5 mils width separated by transparent portions also of approximately 1.5 mils width on the average. Positioned below the clock track at a point in the region of 90° to the optical axis is a lamp 33 having a radially extending filament 34. Filament 34 is positioned along the axis of a cylindrical reflector 35. Midway between filament 34 and the clock track is a double convex converging lens 36 which produces an image of filament 34 in the plane of the clock track. Reflector 35 is provided with an upwardly extending aperture so that all light escaping from reflector 35 through its aperture is collected by lens 36. Positioned above the clock track is a mask 38 having a slit 39 of a radial extent corresponding to that of the clock track and a width of approximately 5 mils. Positioned between the code disc 31 and the mask 38 in a plane-convex converging lens 37 which is disposed appreciably closer to the code disc 31 than to the mask 38. The distance from lens 37 to clock track 31a may be approximately three-tenths the distance from lens 37 to slit 39. The planar surface of lens 37 is adjacent the code disc 31. The image of the filament in the plane of the clock track 31a is brought to a focus at slit 39. Disposed adjacent the upper surface of mask 38 is a photodetector 40 which responds to the light passing through slit 39. The output of photodetector 40 is coupled to an amplifier 41.

For a standard paper 10 of 8.5 inch width, the distance along the scan line in 216 millimeters. The distance between the line being scanned and the center of curvature 101 of spherical mirror 20 may be 195 mm. Mirror 16 may be positioned 50 mm below point 110, so that the distance from mirror 16 to point 101 is 145 mm. The offset distance between the axis of rotation 100 of drum 17 and the center of curvature 101 of the spherical mirror 20 may be 15.2 mm. Drum 17 may have a radius of 62.3 mm; and the radius of curvature of the spherical mirror 20 may be 124 mm. The focal length of spherical mirror 20 is thus 62 mm. Aperture 18 may have a radius of 5.2 mm. Light from point 110 at the midpoint of the scan line is reflected from mirror 16, passes through aperture 18 to spherical mirror 20, and is brought to a focus at point 120. This light passes through optical fiber 21, is sensed by photodetector 23, and provides a corresponding output from amplifier 24.

Point 111 is a virtual image of point 110 which lies on the optical axis 50 mm distant from mirror 16 and produces the same ray paths as if mirror 16 were omitted. Point 210 lies on the scan line at one margin of paper 10. Point 211 is a virtual image of point 210. Light from point 210 is reflected from mirror 16, passes through aperture 18 to spherical mirror 20 and is brought to a focus at point 220. Mirror 16 may have a length of approximately 170 mm which is considerably less than the 216 mm length of the scan line.

In the disclosed system the distance y along the scan line is a function of the angular displacement of the drum 17. It will be apparent from the showing of FIG. 2 of the drawings that:

(1) $(R)/\sin \theta = (d)/(\sin(\theta - \alpha))$ where R is the radius of drum 17, d is the distance between the center 100 of drum 17 and the center 101 of mirror 20, $\theta$ is the angle between the optical centerline of the system and the line of sight from mirror 20 to the scan line on which points 111 and 211 lie, and $\alpha$ is the angular displacement of drum 17. Further it will be apparent that:

(2) $\tan \theta = y/x$ where y is the distance along the scan line from the optical centerline and x is the distance along the optical centerline from the center 101 of the mirror 20 to the scan line. A relatively close linear approximation of the relationship between angular displacement $\alpha$ of drum 17 and the distance y for small angles can be arrived at by assuming that both the sine of the angle and the tangent of the angle are equal to the angle. With this assumption, from equations (1) and (2) it can readily be shown that:

(3) $y = (R \times \alpha)/(B - d)$ where R, d and x are constants for a given system.

Using the relationships outlined above in equations (1), (2) and (3), the intersegmental spacing of the segments of groups 31a and 31b can readily be determined. While the approximation of equation (3) is remarkably good, giving less than 8% error at $\theta = 29°$ and $\alpha = 22.2°$, preferably we used the approximation only in the center region of the scan. As the limits of the scan are approached the segments are more closely spaced, accurately to indicate the nonlinear relationship between the angular displacement of the drum and the position of the line of sight along the scan line.

It is to be noted further that, preferably, we use a filament 15 made up of non-uniform segments extending between adjacent pairs of the points 15a to 15f in FIG. 2. Of these points 15a, 15c and 15e are connected to one terminal of a voltage source while 15b, 15d and 15f are connected to the other terminal. This arrangement compensates for cosine losses in the optical system.

Referring now to FIG. 5 we have shown an alternate embodiment of our invention in which we employ pinholes, such as pinhole 21a, in wall 17b to scan the image arc. In this arrangement light passing through the pinhole impinges on the plane surface of a section of an inclined plano-convex lens which focuses the light on detector 23. We support detector 23 on a stationary rod 43 extending upwardly through the hollow shaft 25. Pinhole 21a may have a diameter of one mil and should lie in the plane of the optical axis. Hence the upper surface 17a of the drum will extend slightly above this plane, reducing the aperture to somewhat less than a semicircle.

In use of our optical scanner, lamp 14 illuminates the document 10 and an image of a line on the document is translated to mirror 16. Mirror 16 translates the line image to the surface of spherical reflector 20 which focuses the image of the arc of a circle at the upper edge of drum 17 through which the ends of optical fibers 21 and 22 pass as the drum rotates. As the end of one of the fibers 21 traverses the arc, light from the image passes along the fiber to the sensor 23 so that amplifier 24 provides a signal which varies with the intensity of the image focused on the arc by the reflector 20.

Further in the course of a scanning operation, sensor 40 detects the passage of the code track segments below the opening 39 in the mask 38 to cause the amplifier 41 to provide a train of pulses representing equal increments of distance y along the scan line. The outputs from amplifiers 24 and 41 may be applied to a suitable memory which stores the information for subsequent use such as transmission to a remote location.

Referring now to FIG. 6, mirror 16 is omitted so that the line being scanned is the actual object itself rather than its virtual image as in FIG. 1. In FIG. 6 the optical axis extends vertically, at right angles to the plane of paper 10, and is defined by a substantially semicircular plano-convex lens 18a having a focal length of approximately 38 mm. Lens 18a may have a radius of 5.2 mm; or a lens of larger radius may be used in conjunction with a semicircular aperture stop. Lens 18a may be positioned 195 mm below the plane of paper 10. Shaft 25 is mounted for rotation about a horizontal axis which intersects the optical axis at right angles. The offset distance between the axis of rotation of drum 17 and lens 18a may be approximately 9 mm. It will be noted that in FIG. 6, the aperture defining lens 18a is offset toward the object from the axis of rotation of drum 17, while in FIG. 1 the axis of rotation of drum 17 is offset toward the object from aperture 18.

In FIG. 6 scanning drum 17 is again provided with a "top" wall 17a lying in the plane of the optical axis of lens 18a, an outer side wall 17b, and a bottom wall 17c (FIG. 5). The scanning drum 17 of FIG. 6, however, is also provided with an inner side wall 17d and a further wall 17e intermediate walls 17a and 17c. The inner side wall 17d may have a radius of approximately 38 mm. Optical fibers 21 and 22 simultaneously pierce the "top" wall 17a and the inner side wall 17d of the drum, and rotate in a plane which includes the optical axis of lens 18a. It will be understood that in the embodiment of FIG. 6, as many as five optical fibers may be provided at intervals of 72°. Each group of clock track segments of code disc 31 subtends 71.2°.

In the embodiment of FIG. 6, the following equations apply:

(4) $R/\sin \theta = (d)/\sin (\alpha - \theta)$ (5) $y = (R \times \alpha)/R + d$ where R is the radius of the inner side wall 17d of the drum and where d is the absolute value of the offset distance. The approximation of equation (5) gives less than ten percent error at $\theta = 29°$ and $\alpha = 35.6°$. Preferably, however, the clock track segments are nonlinearly spaced in order to achieve uniform increments of the distance y along the scan line, as may be determined from equations (2) and (4).

In the embodiment of FIG. 6, an image of a line on document 10 is focused by lens 18a upon the arc of a coplanar circle which is traversed by a field stop such as optical fiber 21 or 22. Light from point 110 impinges on the convex surface of lens 18a and is brought to a focus at point 120, where it is conducted through fiber 21 to detector 23.

It will be seen that we have accomplished the objects of our invention. We have provided an optical scanner for rapidly scanning a straight line on a flat object field. Our scanner is relatively simple in construction for the result achieved thereby. It is inexpensive to manufacture.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An optical line scanning system including in combination means for focusing an image of a line upon an arc of a circle, means providing at least one field stop, and means for causing the field stop means to traverse said circle, said focusing means having a focal length and having an optical center disposed in the plane of said circle, said traversing means including means mounting the field stop means for rotation about an axis which orthogonally intersects the plane at a point offset from said optical center in a direction such that the distance of the field stop means from the focusing means when traversing the image arc exceeds said focal length.

2. A system as in claim 1 wherein the focussing means includes means providing a generally semicircular aperture.

3. A system as in claim 1 wherein the focussing means includes a concave spherical mirror.

4. A system as in claim 1 wherein the focussing means includes a converging lens.

5. A system as in claim 1 wherein thd focussing means includes a concave spherical mirror and a generally semicircular aperture stop positioned adjacent the center of curvature of the mirror.

6. A system as in claim 1 wherein the focussing means includes a generally semicircular converging lens.

7. A system as in claim 1 wherein said line is formed by a real object disposed in the plane of said circle.

8. A system as in claim 1 and further including a plane mirror forming a virtual image of a real object, wherein said line comprises said virtual image.

9. A system as in claim 1 wherein the field stop means includes an optical fiber.

10. A system as in claim 1 wherein the field stop means includes a pinhole.

11. A system as in claim 1 wherein the field stop means comprises a plurality of similar and equally spaced field stops.

12. A system as in claim 1 further including an angular transducer mounted for common rotation with the field stop means.

13. A system as in claim 1 further including a non-linear angular transducer mounted for common rotation with the field stop means.

14. A system as in claim 1 further including a non-linear incremental transducer mounted for common rotation with the field stop means.

15. A system as in claim 1 wherein the focussing means includes a concave spherical mirror and an aperture stop positioned adjacent the center of curvature of the mirror and wherein the rotational axis intersects the plane at a point offset toward said line from the center of curvature.

16. A system as in claim 1 wherein the focussing means includes a converging lens and wherein the rotational axis intersects the plane at a point offset toward said image arc from the lens.

17. A system as in claim 1 further including stationary means for detecting radiant energy and means optically coupling the field stop means to the detecting means.

18. A system as in claim 17 wherein the field stop means comprises one end of an optical fiber and wherein the coupling means includes the remaining portion of said fiber.

19. A system as in claim 1 wherein the field stop means includes a pinhole and wherein the coupling means includes one converging lens.

20. A system as in claim 1 further including an elongated elliptical reflector having a pair of foci disposed along a major axis and an elongated source of radiant energy positioned at one focus, the reflector being provided with an elongated slot adjacent said one focus but displaced from the major axis by an appreciable angle measured from the other focus, said other focus comprising said line.

* * * * *